April 17, 1962 E. W. GORTER ET AL 3,030,306

METHOD OF MANUFACTURING A MAGNET CORE HAVING AN APPROXIMATELY RECTANGULAR HYSTERESIS LOOP

Filed Jan. 10, 1955

INVENTORS
EVERT WILLEM GORTER
HENRICUS PETRUS JOHANNES WIJN
CORNELIS JACOBUS ESVELDT
BY
AGENT

United States Patent Office 3,030,306

Patented Apr. 17, 1962

3,030,306

METHOD OF MANUFACTURING A MAGNET CORE HAVING AN APPROXIMATELY-RECTANGULAR HYSTERESIS LOOP

Evert Willem Gorter, Henricus Petrus Johannes Wijn, and Cornelis Jacobus Esveldt, Emmasingel, Eindhoven, Netherlands, assignors, by mesne assignments, to North American Philips Company, Inc., New York, N.Y., a corporation of Delaware Filed Jan. 10, 1955, Ser. No. 480,908
Claims priority, application Netherlands Jan. 27, 1954
2 Claims. (Cl. 252—62.5)

Magnet cores having an approximately rectangular hysteresis loop are of importance for various uses. This kind of core may inter alia be used for so-called magnetic memories (see for example W. N. Papian; "Proceedings of the I.R.E.," April 1952, pages 475 to 488 and D. R. Brown and E. Albers-Schoenberg; Electronics, April 1953, pages 146 to 149). Such magnetic memories are used inter alia in counting machines and automatic pilots. These cores are, moreover, used in magnetic switches.

The extent to which the shape of the hysteresis loop approaches the rectangular shape may be expressed quantitatively in various ways. A conventional measure is, for example the quotient $$\frac{B_r}{B_{cl}}$$

Figure 1:
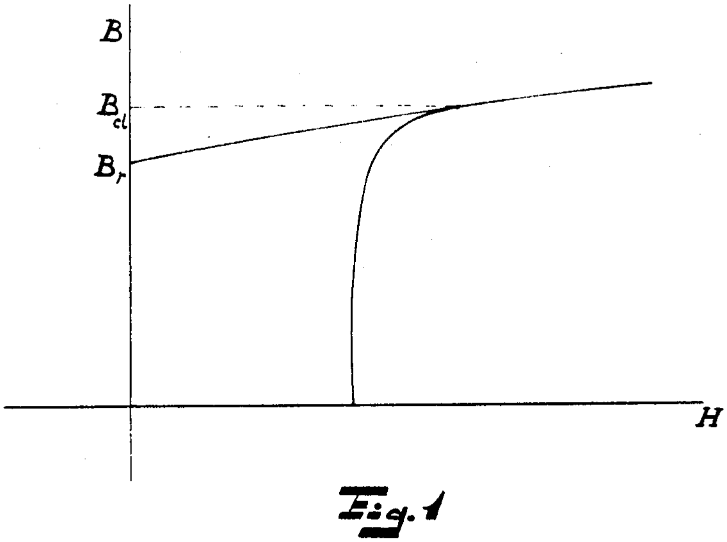

In order to explain the said quotient reference is made to FIG. 1, a diagrammatical view of part of a saturation magnetisation curve. In this figure $B_r$ designates the remanent inductance and $B_{cl}$ the inductance at which the hysteresis loop just closes. In practice it is often difficult to measure $B_{cl}$ with great accuracy. However, an approximately correct value of $B_{cl}$ may be found by taking the average of the inductances subsequent to partial magnetisation or partial demagnetisation (with intermediate saturation), the two inductances measured with the same field strength, which is chosen to be such that the said inductances differ by more than 1% but less than 3% from one another. This was the case with the measurements carried out in accordance with the present invention. For these measurements use was made of a ballistic galvanometer (see Bozorth, "Ferromagnetism," page 843). Where reference is made herein to the quotient $$\frac{B_r}{B_{cl}}$$

this is always assumed to be measured on an annular magnet core having a constant diameter of the ferromagnetic material throughout the periphery of the ring and having an outer diameter of not more than 1.6 times the inner diameter.

Figure 2:
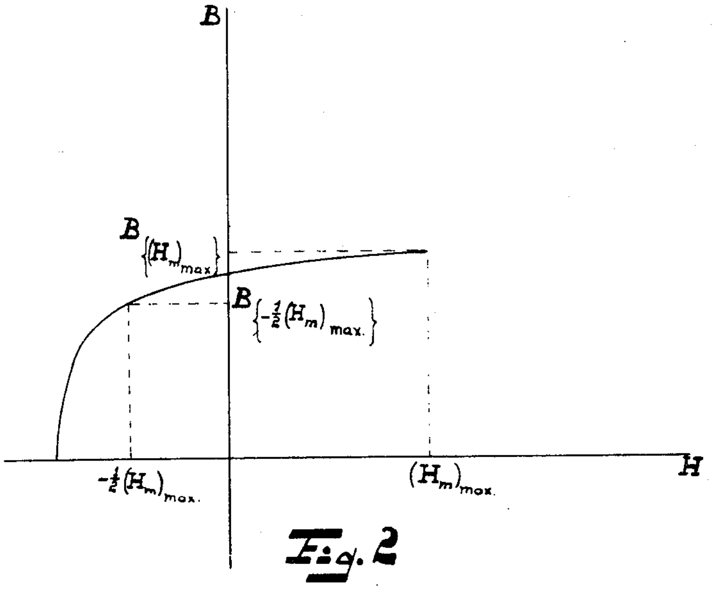

The extent to which the shape of the hysteresis loop approaches that of a rectangle may, as an alternative, be expressed by means of the so-called "squareness ratio" $(R_s)_{max}$. For the meaning of this magnitude reference is made to the aforesaid literature. For the sake of completeness a short explanation follows hereinafter with reference to FIG. 2 which is also a diagrammatical view of part of a magnetisation curve relating to a case in which the demagnetisation was started before the magnetic saturation had been reached. The magnitude $(R_s)_{max}$ is defined by $$\left(\frac{B_{(-1/2H_m)}}{B_{(H_m)}}\right)_{max}$$

The quotient $$\frac{B_{(-1/2H_m)}}{B_{(H_m)}}$$

is a function of the maximum field strength $H_m$ applied.

It appears that this quotient has a maximum value for a particular value of $H_m$, which, as a rule, differs little from the coercivity $H_c$. This maximum value of the quotient is designated by the symbol of $(R_s)_{max}$. The measurements of $B_{(H_m)}$ and $B_{(-1/2H_m)}$, required for the determination of $(R_s)_{max}$ may again be carried out with the aid of a ballistic galvanometer. The measuring objects are also in this case annular magnet cores having a constant diameter of the magnetic material throughout the periphery of the ring and having an outer diameter of not more than 1.6 times the inner diameter.

When using ferromagnetic materials having an approximately rectangular hysteresis loop, we are mostly concerned with alternating currents of high frequency, so that it is required to minimize the occurrence of eddy currents. When using ferro-magnetic alloys this may be obtained to a certain extent by constructing the magnet core from relatively insulated, very thin layers of the ferromagnetic material. However, it is often extremely difficult to construct from these thin layers the cores having an approximately rectangular hysteresis loop. Consequently, with these high frequencies it is advantageous and with higher frequencies it is even necessary to use magnetically weak, ferric-oxide containing materials with spinel structure, since these substances in themselves have a very low electrical conductivity.

For the serviceability of the magnet cores concerned for magnetic memories and magnetic switches it is, moreover, essential that the coercivity $H_c$ should be low (preferably not higher than 10 oersteds and preferably even lower than 5 oersteds) since otherwise too strong magnetic fields are required to change the polarity of the magnetisation of the core.

In accordance with the invention is has now been found that magnet cores having an approximately rectangular hysteresis loop so that the conditions $$\frac{B_r}{B_{cl}}>0.7$$

and/or $(R_s)_{max}>0.6$ and $H_c<4$ oersteds are fulfilled, may be obtained by manufacturing them from a material consisting at least mainly of one compound of the formula:

$$x\text{NiO}\cdot(1-x+y)\text{MnO}\cdot\text{Fe}_2\text{O}_3$$

wherein $$x=0.1\text{–}0.8$$
$$y=0\text{–}0.5, \text{ and}$$
$$x+y\geqq 0.2$$

which compounds are produced by heating a mixture of nickel-, manganese- and iron-compounds in the desired weight ratio in an oxidizing gaseous atmosphere having an oxygen content of 20 vol. percent or more to a temperature of 1400° C. to 1475° C.

*Example*

A mixture of nickel carbonate, $NiCO_3$, manganese carbonate, $MnCO_3$, and iron oxide, $Fe_2O_3$, is ground in alcohol for five hours and then preheated at 900° C. in air for one hour. Subsequent to cooling, the reaction product is again ground in alcohol for two hours, after which the powder obtained is moulded to form a ring. This ring is heated to about 1450° C. in air or in oxygen for two hours.

By varying the ratio between the quantities of nickel carbonate and manganese carbonate in the starting material, annular cores of different compositions are produced. Of a few of these magnet cores the following table indicates the composition, the value of the quotient $$\frac{B_r}{C_{cl}}$$

the value of $(R_s)_{max}$ and the value of $H_c$.

| Composition | | | $\frac{B_r}{B_{c1}}$ | $(R_s)_{max}$ | $H_c$ |
|---|---|---|---|---|---|
| NiO | MnO | $Fe_2O_3$ | | | |
| 0.3 | 0.7 | 1 | 0.7 | 0.5 | 1.35 |
| 0.4 | 0.6 | 1 | 0.8 | 0.65 | 1.4 |
| 0.45 | 0.55 | 1 | 0.75 | 0.7 | 1.4 |
| 0.8 | 0.2 | 1 | 0.8 | 0.6 | 2.8 |
| 0.6 | 0.5 | 1 | 0.6 | 0.6 | 1.8 |
| 0.8 | 0.4 | 1 | 0.7 | 0.7 | 2.5 |
| 0.3 | 0.75 | 1 | 0.7 | 0.65 | 1.5 |
| 0.1 | 0.95 | 1 | 0.55 | 0.6 | 1.5 |

What is claimed is:

1. A method of manufacturing a ferromagnetic ferrite having a substantially square hysteresis loop comprising the steps of forming a mixture of oxides of nickel, manganese, and iron in proportions corresponding to the formula:

$$x\text{NiO}\cdot(1-x+y)\text{MnO}\cdot\text{Fe}_2\text{O}_3$$

in which $x$=0.1–0.8
$y$ is not greater than 0.5, and
$x+y$ is not less than 0.2 heating said mixture in an atmosphere having at least 20% by volume of oxygen to a temperature of about 1400° to 1475° C. for a sufficient time to form after cooling a ferrite having said formula and having a coercive force ($H_c$) of less than 4 oersteds and fulfilling at least one of the following conditions:

(a) $\frac{B_r}{B_{c1}}$ not less than 0.7

(b) $(R_s)_{max}$ not less than 0.6

2. A ferromagnetic ferrite having a substantially square hysteresis loop formed by firing for a sufficient time in an atmosphere having at least 20% by volume of oxygen at a temperature of about 1400° to 1475° C., a mixture of oxides of nickel, manganese, and iron in proportions corresponding to a composition having the formula:

$$x\text{NiO}\cdot(1-x+y)\text{MnO}\cdot\text{Fe}_2\text{O}_3$$

in which $x$=0.1–0.8
$y$ is not more than 0.5, and
$x+y$ is not less than 0.2 said ferrite having a coercive force ($H_c$) of less than 4 oersteds and fulfilling at least one of the following conditions:

(a) $\frac{B_r}{B_{c1}}$ not less than 0.7

(b) $(R_s)_{max}$ not less than 0.6

References Cited in the file of this patent

UNITED STATES PATENTS 2,715,109 Albers-Schoenberg ______ Aug. 9, 1955

FOREIGN PATENTS 697,219 Great Britain __________ Sept. 16, 1953

OTHER REFERENCES

Harvey et al.: RCA Review, September 1950, pp. 321–363 (p. 346).

Physica III, No. 6, June 1936, page 463–483.

UNITED STATES PATENT OFFICE

CERTIFICATE OF CORRECTION

Patent No. 3,030,306 April 17, 1962

Evert Willem Gorter et al.

It is hereby certified that error appears in the above numbered patent requiring correction and that the said Letters Patent should read as corrected below.

Column 2, lines 69 to 71, for $$\frac{B_r}{C_{cl}} \quad \text{read} \quad \frac{B_r}{B_{cl}}$$

Signed and sealed this 11th day of September 1962.

(SEAL)
Attest:

ERNEST W. SWIDER
Attesting Officer

DAVID L. LADD
Commissioner of Patents